United States Patent [19]

Anderson

[11] 3,809,210
[45] May 7, 1974

[54] METHOD AND APPARATUS FOR CONVEYING A CONTAINER

[75] Inventor: Andrew W. Anderson, West Caldwell, N.J.

[73] Assignee: Scandia Packaging Machinery Company, Clifton, N.J.

[22] Filed: Mar. 3, 1972

[21] Appl. No.: 231,588

[52] U.S. Cl............................... 198/179, 198/168
[51] Int. Cl............................................ B65g 15/00
[58] Field of Search........... 198/179, 131, 168, 180; 53/287

[56] References Cited
UNITED STATES PATENTS

| | | | |
|---|---|---|---|
| 2,948,096 | 8/1960 | Anderson | 53/287 |
| 3,631,770 | 1/1972 | Kratzert et al. | 198/179 |
| 1,843,453 | 2/1932 | Littlefield | 198/168 |
| 1,864,114 | 6/1932 | Angerpointner | 198/179 |
| 1,913,001 | 6/1933 | Ross | 198/168 |
| 3,269,524 | 8/1966 | Canfield | 198/180 |

Primary Examiner—Richard E. Aegerter
Assistant Examiner—Joseph E. Valenza
Attorney, Agent, or Firm—Markva & Smith

[57] ABSTRACT

The conveyor assembly includes endless means for moving at least one container along a path. A first means is mounted on the moving means for supporting the container along a first side thereof. A second means is mounted on the moving means for supporting the container along a side opposite said first moving means. The first and second support means are capable of providing sole support for the container as it moves along the path. The conveyor assembly is particularly useful in feeding rimmed tray containers through a wrapping machine. More particularly, while the first and second support means are holding the container on opposite sides thereof, a cover sheet is being folded along adjacent unsupported side rims as the container moves along a path. A further feature is directed to a mechanism which operates when the conveyor means changes direction. Another feature of the invention is directed to the adaptability for the conveyor assembly to various sized containers.

10 Claims, 12 Drawing Figures

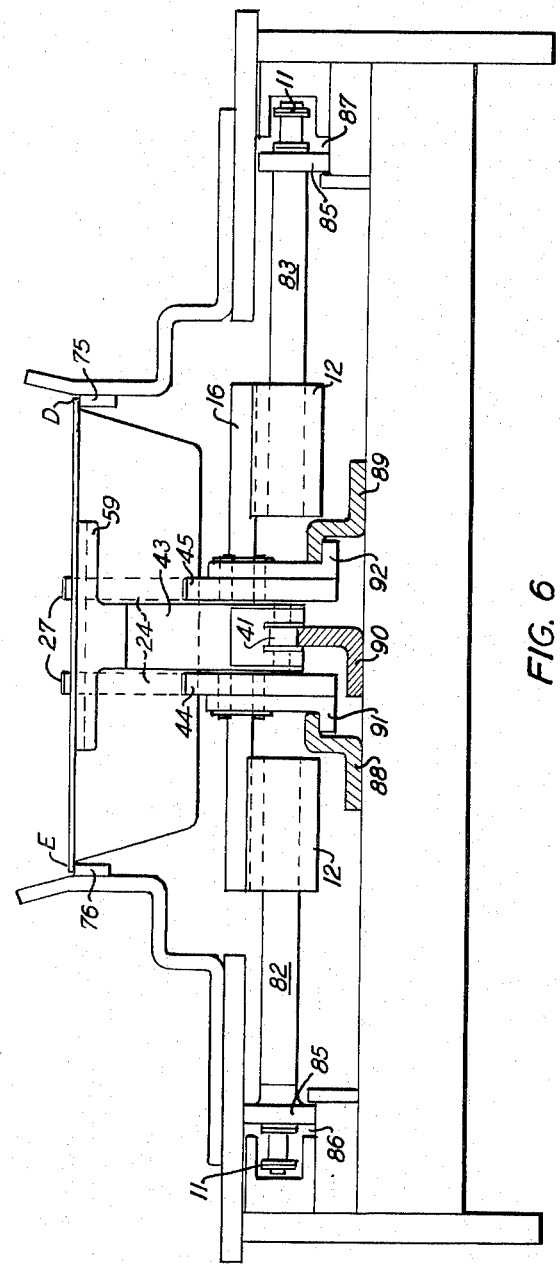
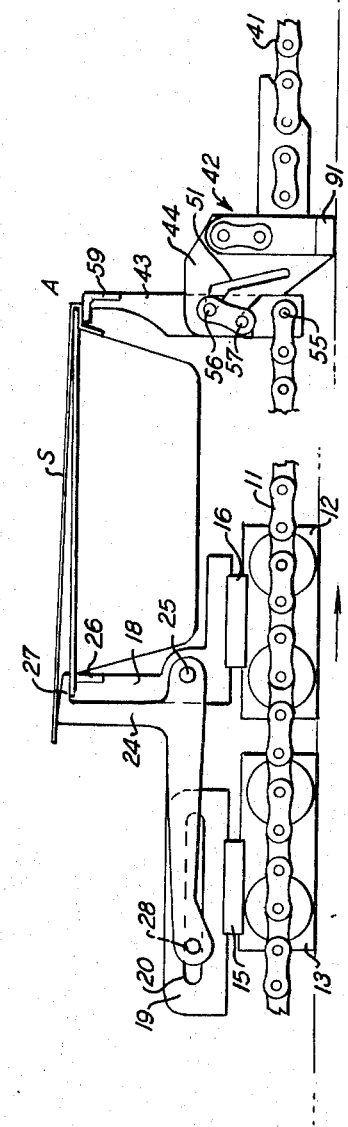
FIG. 6
FIG. 7

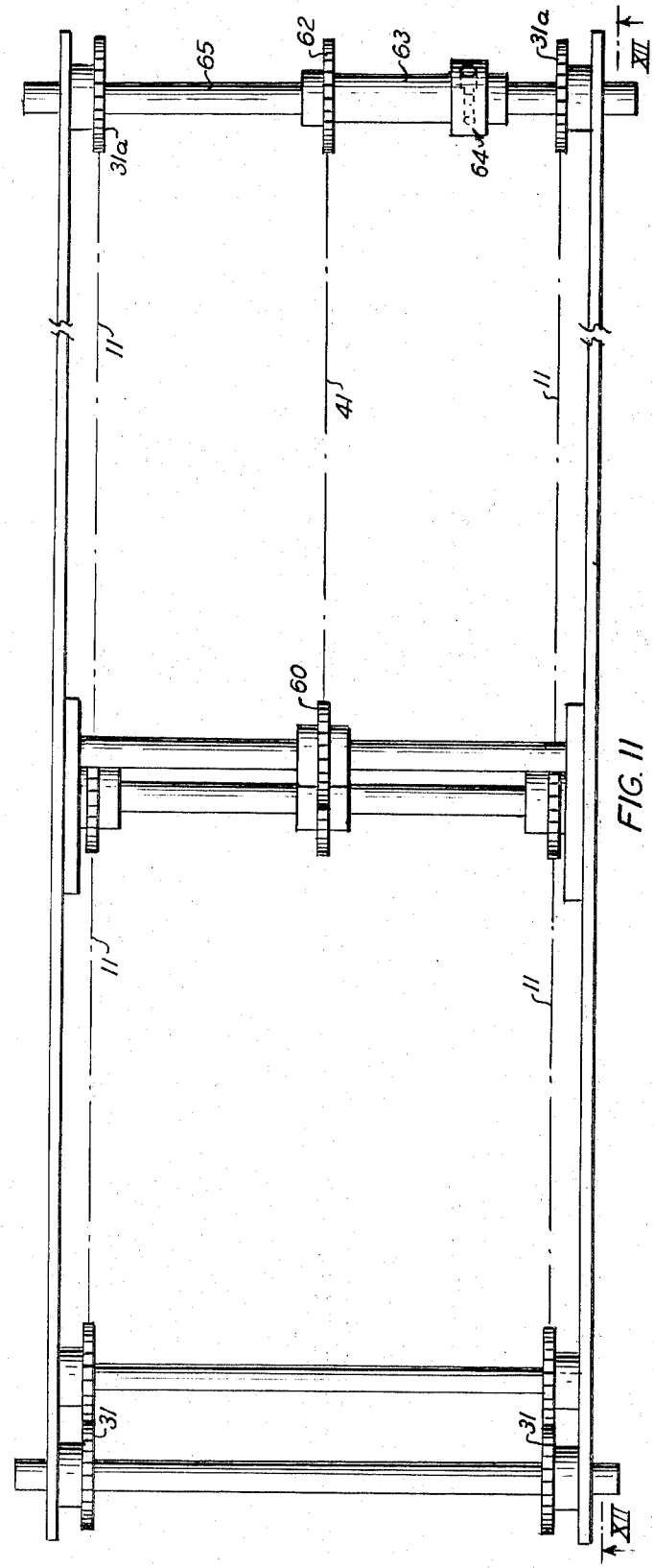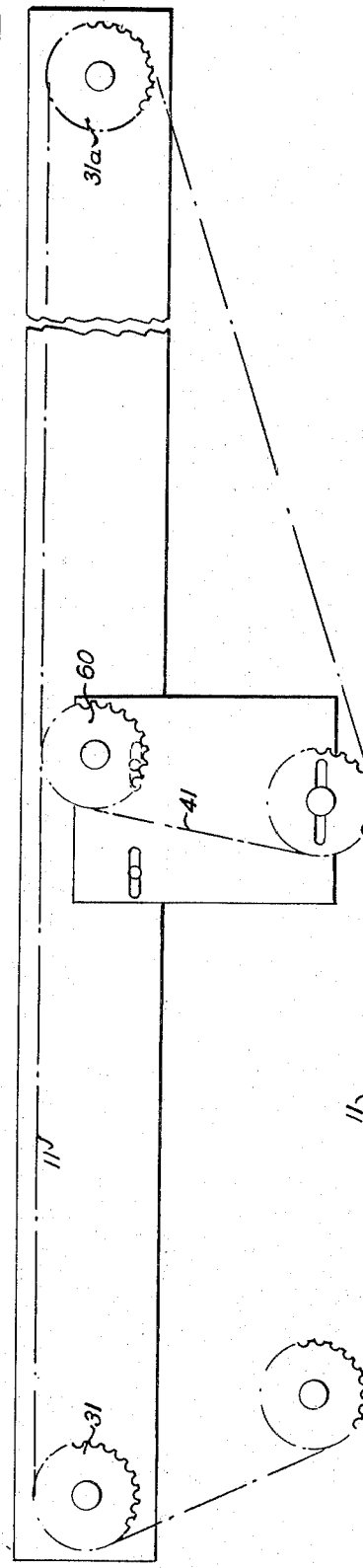

METHOD AND APPARATUS FOR CONVEYING A CONTAINER

BACKGROUND OF THE INVENTION

This invention relates to a conveyor assembly which may be used in conjunction with wrapping and/or filling machines. More particularly, the conveyor assembly is used for holding and feeding a container over which a flexible cover such as metal foil is secured after material has been loaded therein.

At the present time, open receptacles or containers may be filled or loaded with food and then covered by a flexible sheet of material such as metal foil. A mechanism for feeding and covering such containers is disclosed in U.S. Pat. No. 2,948,096. The prior art apparatus was developed to take the place of manual operations including the folding of the foil around or beneath the rimmed edges of the container. The prior art mechanism was used to very smoothly cover the food disposed in the receptacle and enable it to be pulled tightly so that the contents of the container would not puncture the covering foil.

The containers or receptacles being covered include rim portions which project outwardly from all four sides thereof. To facilitate the folding of the side edges of the sheet as the container moves along a path, the prior art mechanism has proved to be satisfactory to first fold the projecting side edges of the sheet downwardly. These edges then go into the usual folding mechanism for folding the edges underneath the side rims.

The prior art mechanism provided a simple and practical means for feeding and holding such a container while securing a sheet of flexible material along a first edge thereof. However, difficulty was encountered during the folding of the metal foil along opposite side edges of the container as it moved along a path. The prior art mechanism worked extremely well for foil having a thickness of about 1 mil. However, a smooth folding operation was not attainable along opposed side rim portions when using thin metallic foil webs with a thickness of about 0.0005 inch.

In the structure disclosed in U.S. Pat. No. 2,948,096, the side rims are supported by the folding mechanism as the container moves along the path. More specifically, it has been found that the thinner foil web cannot be satisfactorily folded underneath the side rims while the container is being supported by the usual folding mechanism.

PURPOSE OF THE INVENTION

The primary object of this invention is to provide a conveyor assembly which may be used in conjunction with the usual prior art folding mechanism and effectuate the covering of a rimmed container with a very thin web of metallic foil.

Another object of this invention is to provide a conveyor assembly which may be used to feed and hold a container for feeding and securing a wrapper sheet of flexible material snugly over the loaded container.

Another object of this invention is to provide an assembly which may be adjusted for conveying various sized containers through a machine.

A further object of this invention is to provide a mechanism that will hold down the container and prevent it from tilting or moving out of position as it is fed through a container covering assembly.

SUMMARY OF THE INVENTION

The method as disclosed herein includes the steps of moving a tray container having a rim configuration on four sides thereof along a path to a cover sheet applying station. A first edge of a cover wrapper sheet is folded over and around a leading rim portion of the container. The tray container is supported below the leading rim edge and a trailing rim edge in an elevated position to maintain the side rim portions free of any support as it proceeds through subsequent folding stations. The wrapper sheet is then folded downwardly and around the side rim portions as the container moves along the path in the elevated position. Finally, the trailing edge of the wrapper sheet is folded over and around the trailing rim portion of the container.

The specific apparatus used to effectuate movement of a tray container along a path includes first and second support mechanisms mounted on an endless moving means so that the support mechanisms are capable of providing sole support for the container along two opposite sides thereof as it moves along a path. Particular features of the invention are directed to specific structures used for the first support mechanism and the second support mechanism. Each support mechanism includes a first element attached at a first location on an endless conveyor means and is held substantially fixed with respect to the conveyor means. A second element is pivotally mounted at a second location on the endless conveyor means. A cam surface is disposed on one of the elements for sliding movement along the cam surface. The first location of the first element is spaced from the second location by a sufficient amount so that when the conveyor means changes direction, the pivotally mounted second element will move in a path defined by the movement of the cam follower along the cam surface.

A further feature of the invention is directed to a means for adjusting the distance between the first and second support means so that various sized containers may be accommodated by the conveyor means.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 6 is a sectional view along line VI—VI of FIG. 5;

FIG. 7 is a side elevational view, partly broken away, showing the container in the lateral side rim folding work station;

FIG. 11 is a schematic top plan view of an endless conveyor with a mechanism for adjusting the distance between the container support mechanisms; and FIG. 12 is a schematic elevational view of the conveyor of FIG. 11.

DESCRIPTION OF THE SPECIFIC EMBODIMENTS

Figure 1:
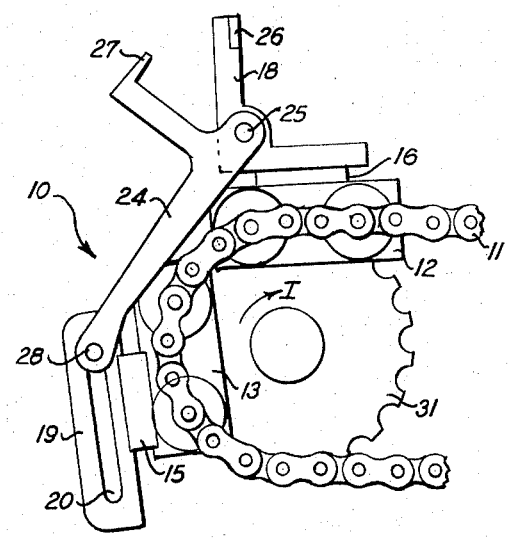
FIG. 1 is a side elevational view, partly broken away, showing a support mechanism in open position.

More specifically, a conveyor assembly made in accordance with this invention is shown in the figures. The assembly includes a first support mechanism 10 mounted on the double endless conveying chains 11. The mounting blocks 12 and 13 are mounted within the conveying chains 11 and adapted to interconnect the pair of conveying chains 11. Blocks 12 and 13 are free to move independently of each other but are arranged to interconnect groups of chain links within each of the chains 11. In other words, the blocks 12 and 13 are arranged on each chain 11 in adjacent locations but are independent and can move freely with respect to each other.

Base members 15 and 16 extend between the respective pairs of blocks 12 and 13 that are mounted on chains 11.

A rim support element 18 is attached along its base to base member 16 and includes a support bar 26 that extends below the rim B of the container C. Hold-down member 24 is pivotably mounted at 25 onto the support member 18. A cam follower 28 is mounted at the other end of the hold-down member 24. The cam member 19 having an elongated slot 20 is mounted on the base member 15. The cam follower 28 is disposed in the slot 20 so that the path of movement of the hold-down member 24 is defined as the chain 11 changes direction while moving around the sprocket 31.

A hold-down element 24 includes a finger portion 27 which is cammed into place above the rim B of the container C as the chains 11 move into a path of movement that is parallel to the path of movement for the container C. There are two hold-down members 24 disposed on each side of the support element 18 and cam member 19. The two support elements 24 are interconnected by way of the cam follower 28 and the pivotal connection at pivot 25.

Figure 2:
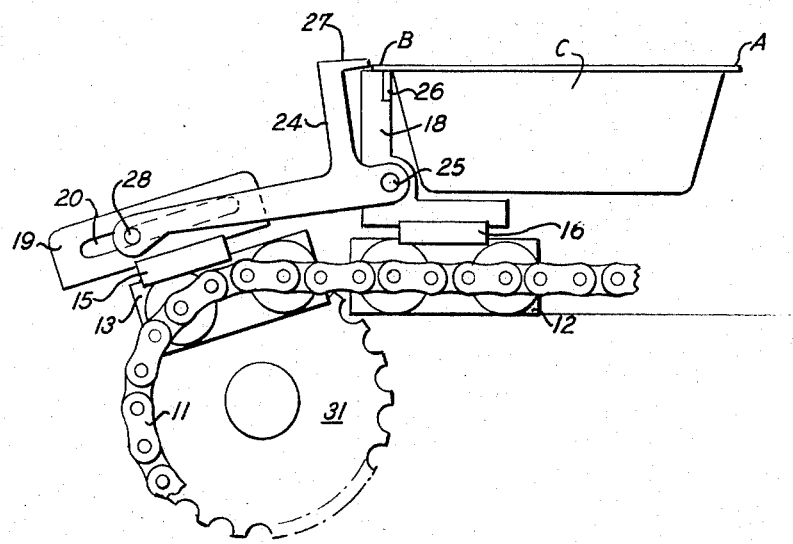
FIG. 2 is a side elevational view, partly broken away, showing the mechanism of FIG. 1 engaging a rimmed container.

As the endless chain 11 moves upwardly in the direction of the arrow I, the cam follower 28 slides longitudinally along the cam slot 20. The block 12 leaves the chain sprocket 31, thus following a generally tangential path as viewed in FIGS. 1-2. As block 13 moves tangentially along the sprocket 31, the cam mechanism 28 approaches the trailing portion of the cam slot 20 and the hold-down members 24 are rotated in a clockwise direction as shown by the arrow II.

Finger portion 27 is designed to fit over the end of the support element 18. Thus the rim B is disposed between the finger portion 27 and the support bar 26. The hold-down member 24 and support member 18 thus provide stabilization of the container C as it moves along the path of movement. The pivotal element 24 is locked into a fixed relationship with the support member 18 as the blocks 12 and 13 are moved in a lineal direction along with the chains 11.

Figure 9:
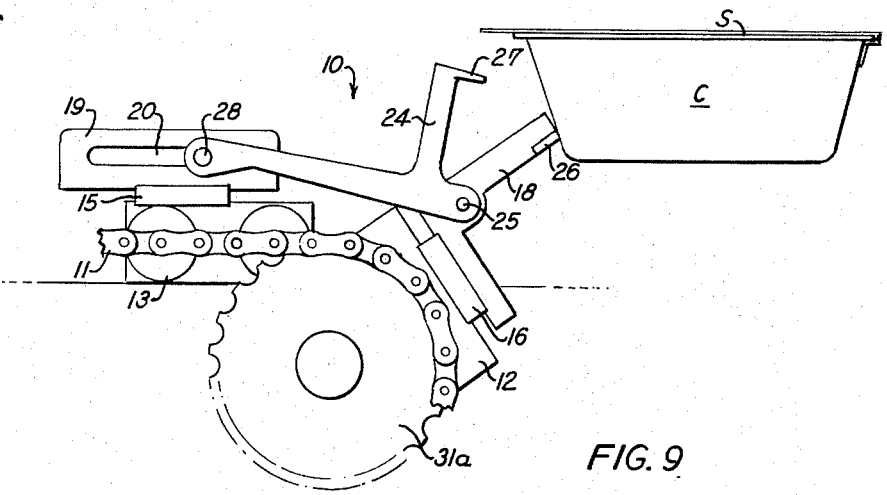
FIG. 9 is a side elevational view showing the support mechanism of FIG. 1 disengaging from the container.
Figure 10:
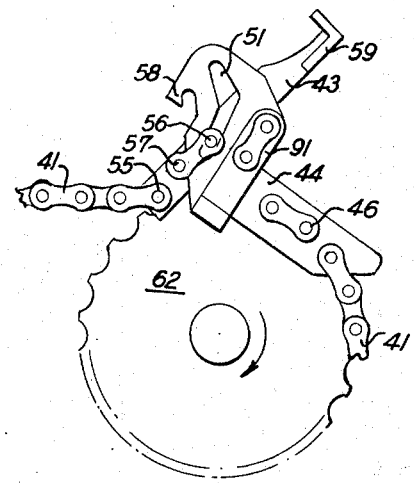
FIG. 10 is a side elevational view showing another support mechanism disengaging from the container.

When the block 12 moves out of the lineal path as the chain 11 moves around a second sprocket 31a, the hold-down element 18 rotates out of the way and the cam follower 28 moves forward in the cam slot 20. The container C is released as shown in FIG. 9 when the support mechanism 10 moves around the sprocket 31a.

Figure 3:
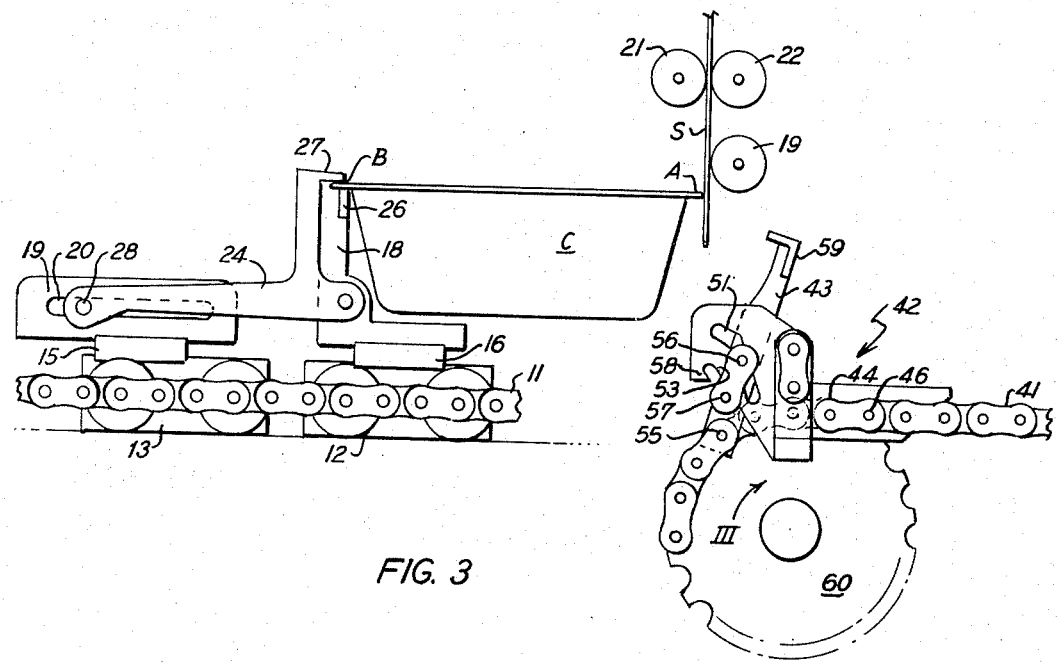
FIG. 3 is a side elevational view of the container disposed at a wrapper sheet applying work station.
Figure 4:
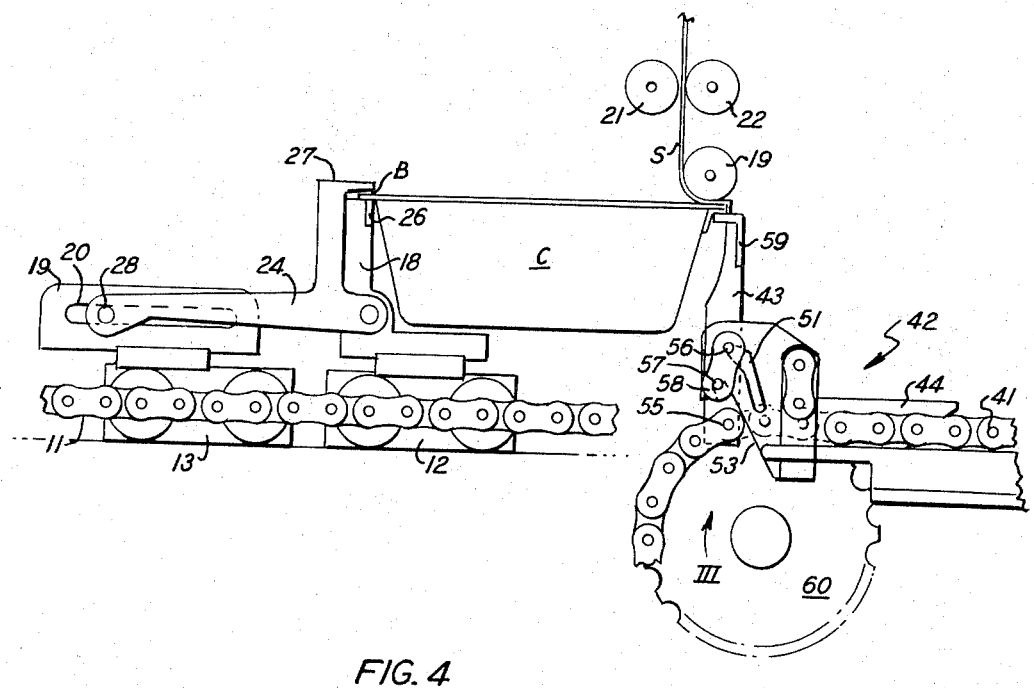
FIG. 4 is a fragmentary side elevational view showing a first folding operation.
Figure 5:
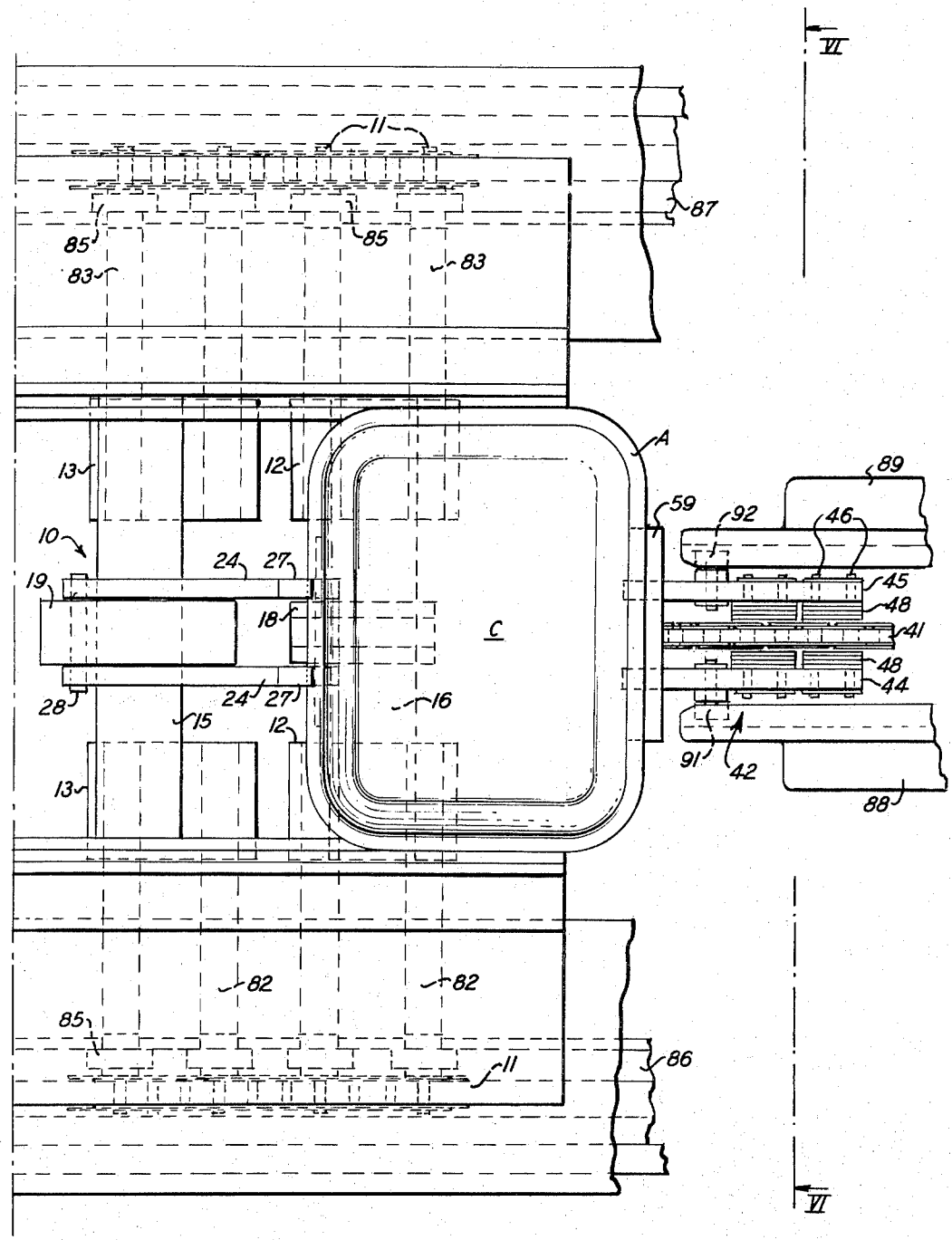
FIG. 5 is a top plan view of the apparatus as shown in FIG. 4.

Another support mechanism 42 is activated at the wrapper sheet applying work station as shown in FIG. 3. The first pusher support mechanism 10 moves the container C along the rails 75 and 76 to the wrapper sheet applying station where a sheet S is fed vertically downwardly by the rollers 21 and 22. The roller 19 is used to spread the sheet S along the top of the container C as it moves therebelow. The support mechanism 42 includes a folding-support element 43 which carries a support bar 59 along the top thereof. The support bar effectuates a fold of the foil material in sheet S underneath the leading rim A as shown in FIG. 4.

The support mechanism 42 includes a first fixedly mounted element including two plates 44 and 45 arranged to straddle the chain 41. This first element is attached at a first location on the endless conveyor chain 41 and is held substantially fixed with respect to the chain 41. A second pivoting element 43 is pivotably mounted at pivot pin 55 on chain 41.

A cam slot 51 is located in each of the plates 44 and 45. Interconnecting pins 46 hold the plates 44 and 45 in proper lined relationship with spaces 48 being disposed between the plates 44 and 45 and the chain 41. Additional cam surface 53 is located along the outer surface of each of the plates 44 and 45. Cam followers 56 and 57 move along the cam slot 51 and cam surface 53, respectively, during the action of the conveyor assembly. A hook portion 58 is used to help provide a lock for rigidly positioning the element 43 at its uppermost location when the chain 41 is moved along a linear path.

When the chain 41 changes direction in a vertical plane as shown by arrow III, the plates 44 and 45 move tangentially with respect to the radius of the sprocket 60. The support element 43 pivots about pivot pin 55 as the cam followers 56 and 57 move along their respective cam surfaces 51 and 53. The path of movement for the element 43 is a direct function of the configuration of the cam surfaces. The support bar 59 moves in a sweeping motion upwardly as the mechanism 42 moves in the direction III. The position of the respective elements as it moves about the sprocket 60 is shown in FIG. 3.

When the chain 41 moves around a subsequent sprocket at the end of the conveyor, the movement of the elements 43 and plates 44 and 45 with respect to each other is reversed. The distance between the pivot pin 55 and cam follower pins 56 and 57 is fixed. As the plates 44 and 45 move in a radial path about a sprocket, the cam follower pin 56 moves downwardly in the slot 51 forcing the element 43 to pivot around the pivot shaft 55. After the sheet S has been folded around the leading rim A, the container C is fully supported beneath the leading rim A and the trailing rim B by the support mechanisms 42 and 10, respectively.

This relationship is shown in FIG. 7. It is at this location that the lateral side edges of the sheet S which extend over the lateral rims D and E is folded downwardly and underneath the respective rims. The usual folding mechanism as disclosed in U.S. Pat. No. 2,948,096 is used very efficiently with respect to the wrapping operation disclosed herein. The usual folding mechanism is completely set forth in the U.S. Pat. No. 2,948,096 and does not form a part of the present invention. However, it is noted that the usual folding mechanism includes folder members 96 which are positioned along the underside of the lateral rims D and E of the container C.

Normally, in the prior art structure, the rims D and E rest directly onto the folding guides 96 which provide the support for the container as well as effecting the folding of the lateral edges of the sheet S underneath the respective rims D and E. It is at this point that the prior art structure has created problems as explained hereinabove.

Figure 8:
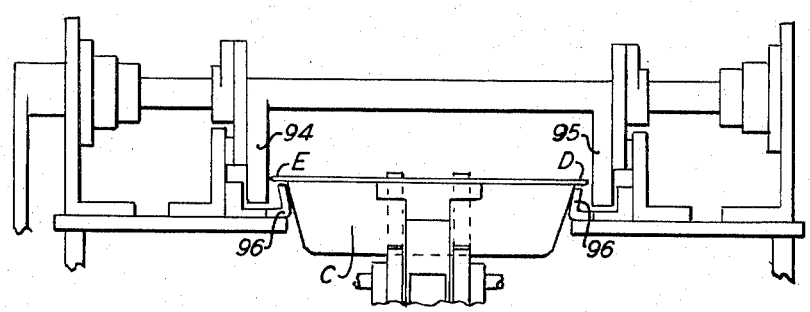
FIG. 8 is a sectional view showing the usual mechanism for folding the lateral side edges of the cover sheet around and underneath the side rim portions of the tray container in combination with the conveyor assembly of this invention.

The conveyor assembly in the present invention provides support for the container C below the leading rim A and the trailing rim B by the first and second support mechanisms 42 and 10, respectively. The outer side portions of the cover sheet S are folded downwardly by the folding arms 94 and 95 as shown in FIG. 8. The folding guides 96 position the edges of the sheet S under the side rims D and E and against the sides of the container C. The weight of the container is not supported by the folding guides 96 which provide only the folding operation. Any drag due to contact between the guides 96 and the cover sheet S is completely eliminated.

Stabilizing slide members 91 and 92 are fixedly mounted on each of the plates 44 and 45 in the support mechanism 42. The slide members 91 and 92 are L-shaped and stabilizing channels 88 and 89 are positioned on each side of the path of movement for the support mechanism 42. The channels provide a slotted guide way into which the ends of the slide members 91 and 92 fit. Members 91 and 92 slide along the undersurface of the channels 88 and 89 to provide lateral stability for the support mechanism 42. The endless conveying chain 41 moves longitudinally along the upper surface of a chain support rail 90. The channels 88 and 89 and the support rail 90 provide necessary stabilization of the mechanism 42 as it moves along a desired path. The slide members 91 and 92 may be fabricated from any type of material which produces a low coefficient of friction such as Teflon, Kel-F, or other suitable materials.

The feeding and covering operations using the conveyor assembly and mechanism of this invention may be summarized as follows. The containers C are placed in any suitable manner on the rails 75 and 76 and are picked up by the pusher support mechanism 10 and fed along on the rims D and E. During this operation, the rear edges of the containers are held down by the finger portion 27 at the top end of the hold-down mechanism 10. The cover sheet S is fed downwardly into the path of the movement of the container C. As the container C reaches the position shown in FIG. 4, the crimping element or bar 59 will move upwardly and engage the lower end of the sheet S and fold it around and beneath the front leading rim portion A.

As the container C advances along the covering assembly, the cover sheet S will be laid over the top of the container as the container passes beneath the rollers 19. When the container reaches the position beneath the usual folding blades or arms 94 and 95 as shown in FIG. 8 and disclosed in U.S. Pat. No. 2,948,096, the side overlapping portions of the cover sheet S will be folded downwardly along the side rims D and E. Thereafter the container passes through suitable folding mechanism where the downwardly extending portions are folded around and beneath the side rims D and E.

Again, in the usual prior art folding operation, the side rims rest directly onto the folding guides 96. However, the conveyor assembly of this invention provides a first support mechanism 10 and a second support mechanism 42 which support the container C in an elevated position to maintain the side rim portions thereof free of any support or drag by the folding guides 96.

The containers with covers then pass into subsequent operations (not shown) so that the rearwardly projecting portion of the cover sheet is folded over and around the rear or trailing rim portion B. Such a subsequent folding mechanism that may be used in conjunction with the apparatus of the instant invention is disclosed in U.S. Pat. No. 2,889,675 issued June 9, 1959, and U.S. Pat. No. 3,138,906 issued June 30, 1964.

Referring to FIGS. 11 and 12, the two chains 11 which carry the first support mechanism 10 are driven around the sprockets 31 and 31a. The chain 41 which carries the second support mechanism 42 is driven around sprockets 60 and 62. The sprockets 31a and 62 are mounted on axle member 65. The sprocket 62 is fixedly mounted on an adjustable sleeve 63 which may be rotated about the axle 65 when the clamp assembly 64 is loosened. Upon loosening the clamp assembly 64, the drive sprocket 62 may be angularly changed thereby changing the horizontal relationship between the chains 11 and 41.

The first support mechanism 10 is connected to the chain 11 by the elongated rod members 82 and 83 which carry rollers 85 disposed on either side of the path of movement. The rollers 85 are moved within the guide slots 86 and 87. The rods 82 and 83 extend from opposite sides of the support mechanism 10 from the blocks 12 and 13. The relationship between the mechanism 10 does not change with respect to the chains 11. Therefore, when the adjustment is made between the chains 41 and 11, the respective relative distance between the support mechanisms 10 and 42 is appropriately adjusted. It is therefore possible to provide a very flexible use for the cover machine or the particular machine in which the conveyor apparatus is being employed.

While the method and apparatus for conveying a container has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A conveyor assembly comprising:
   a. endless moving means for moving at least one container along a path,
   b. first support means mounted on said moving means for supporting the container along a first side thereof, and c. second support means mounted on said moving means for supporting the container along a side opposite said first side, d. one of said support means including a first element connected at a first location on said moving means and a second element pivotally mounted at a second location on said moving means, e. a cam surface being disposed on one of the elements and f. a cam follower being disposed on the other element for sliding engagement with said cam surface, g. said first location being spaced from said second location by a sufficient amount so that when the moving means changes direction, the first and second support elements will move with respect to each other.

2. An assembly as defined in claim 1 wherein said moving means includes a first endless closed loop conveying means carrying said first support means and a second endless closed loop conveying means carrying said second support means, at least one of said first or second conveying means being adjustable so that the distance between the support means may be varied to accommodate different sized containers.

3. A mechanism in combination with endless conveyor means, said combination comprising:

a. a first element attached at a first location on said endless conveyor means and being held substantially fixed with respect to said conveyor means, b. a second element pivotally mounted at a second location on said endless conveyor means, c. a cam surface means being disposed on one of the elements, and d. a cam follower means being disposed on the other of said elements for sliding movement along said cam surface means, e. said endless conveyor means includes means for changing direction in a plane that is perpendicular to the path of movement, f. said first location being spaced from said second location by a sufficient amount so that when the conveyor means changes direction, the pivotally mounted second element will move in a path defined by the movement of the cam follower means along said cam surface means.

4. A mechanism as defined in claim 3 wherein said cam surface means comprises an elongated slot configuration and said cam follower means comprises a projection which fits into said slot configuration.

5. A mechanism as defined in claim 3 wherein said pivotally mounted second element includes a means for engaging an article for movement along a path defined by said conveyor.

6. A mechanism as defined in claim 3 wherein said cam surface means includes a slot configuration located on said first element and said cam follower means includes a projection disposed on said second element, said conveyor means comprises a closed loop chain disposed around at least two sprockets, whereby when the chain changes direction as it passes around the sprockets the cam follower projection will slidingly move along said cam surface slot configuration.

7. A mechanism as defined in claim 3 wherein said cam surface means includes a structural configuration effective to lock the second element in position with respect to the first element when the conveyor means is effecting movement of the elements in a lineal direction with respect to each other.

8. A mechanism as defined in claim 7 wherein said cam surface means includes a double cam surface disposed on said first element and said cam follower means includes two projections which are linked together disposed on said second element, each said projection being in sliding engagement with a respective cam surface.

9. A mechanism as defined in claim 3 wherein said first element includes a means for stabilizing the mechanism as the conveyor means effects movement along said path.

10. A conveyor assembly comprising:

a. endless moving means for moving at least one container along a path, b. first support means mounted on said moving means for supporting the container along a first side thereof, and c. second support means mounted on said moving means for supporting the container along a side opposite said first side, d. said first support means including a first element adapted to be disposed beneath a first rim portion projecting from one side of the container and a second element including hold-down means which projects over the first rim portion and has a slot configuration, e. said first element being mounted on said moving means at a first location thereon, and f. said second element being pivotally mounted at a second location along said moving means about a movable axis disposed in said slot configuration and being pivotally mounted about a fixed axis that is located on the first element, g. said first and second locations being spaced with respect to each other along said moving means by a sufficient amount so that when the moving means changes directions, the second element will pivot with respect to the first element thereby assuming respective positions adjacent the first rim portion.

* * * * *